US009746129B2

(12) United States Patent
Fitzgerald, IV (10) Patent No.: US 9,746,129 B2
(45) Date of Patent: Aug. 29, 2017

(54) PUCK WEAR DETECTION

(71) Applicant: Momentive Performance Materials Inc., Waterford, NY (US)

(72) Inventor: Matthew Louis Fitzgerald, IV, Johnsonville, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 479 days.

(21) Appl. No.: 14/016,052

(22) Filed: Aug. 31, 2013

(65) Prior Publication Data

US 2015/0059294 A1 Mar. 5, 2015
US 2015/0184793 A9 Jul. 2, 2015

Related U.S. Application Data

(63) Continuation-in-part of application No. 13/840,151, filed on Mar. 15, 2013.

(60) Provisional application No. 61/707,807, filed on Sep. 28, 2012.

(51) Int. Cl.
*B65B 3/04* (2006.01)
*F16M 11/22* (2006.01)
*B65B 43/42* (2006.01)
*B65B 7/28* (2006.01)

(52) U.S. Cl.
CPC ............... *F16M 11/22* (2013.01); *B65B 3/04* (2013.01); *B65B 7/2821* (2013.01); *Y10T 29/4973* (2015.01)

(58) Field of Classification Search
CPC .. B65B 3/04; B65B 3/045; B65B 3/16; B65B 43/42; B65G 13/02; B65G 17/36; B65G 17/365; B65G 17/04; G01N 35/04; G01N 35/0406

USPC ........................................................ 53/284.5
See application file for complete search history.

(56) References Cited

U.S. PATENT DOCUMENTS

| | | | | |
|---|---|---|---|---|
| 2,574,157 A | * | 11/1951 | Reichert | ................... B65B 3/16 |
| | | | | 279/66 |
| 3,147,018 A | * | 9/1964 | Reichert | ................... B65B 3/16 |
| | | | | 248/108 |
| 3,199,552 A | * | 8/1965 | Nordfors | ................... B65B 3/16 |
| | | | | 141/313 |
| 3,327,450 A | * | 6/1967 | Carter | ................... B65B 39/006 |
| | | | | 294/93 |

(Continued)

FOREIGN PATENT DOCUMENTS

WO   WO 03008151     1/2003
WO   WO 2011028166   10/2011

*Primary Examiner* — Gloria R Weeks
(74) *Attorney, Agent, or Firm* — James C. Abruzzo (57) ABSTRACT

A transport puck vertically aligns a caulking cartridge, nozzle-down. The puck includes (i) a substantially solid lower plug portion, having a lead face and a bottom face and an center passageway that is at least partially inverted frustum-shaped that forms a side contact face that tapers from a wider lead face opening to a narrower bottom face opening; and or to a tubular sleeve from the side contact face to the bottom face opening; (ii) an upper sleeve, shaped to receive the caulking cartridge in a desired vertical alignment to the lower plug portion; and (iii) at least one funnel-shaped bore into the bottom face with an inserted connector comprising a head and stem, the head spaced within the bore to define a spacing that has been determined to identify bottom face wear.

20 Claims, 5 Drawing Sheets

(56) References Cited

U.S. PATENT DOCUMENTS

| | | | | |
|---|---|---|---|---|
| 3,367,472 | A * | 2/1968 | Rossi | B05C 13/025 198/377.03 |
| 3,390,891 | A * | 7/1968 | Stichhan | B65B 3/16 269/254 R |
| 3,599,389 | A * | 8/1971 | Hartman | B65B 35/58 250/365 |
| 3,788,035 | A | 1/1974 | Geisel | |
| 3,819,194 | A * | 6/1974 | Grevich | B65B 3/16 141/313 |
| 3,941,237 | A * | 3/1976 | MacGregor, Jr. | B08B 9/28 198/690.1 |
| 4,051,878 | A * | 10/1977 | Ohmeis | A45D 40/16 141/150 |
| 4,250,685 | A * | 2/1981 | Elsworth | B65B 7/2807 53/282 |
| 4,305,496 | A * | 12/1981 | Hoppmann | B65B 35/26 198/418.4 |
| 4,373,560 | A * | 2/1983 | Elsworth | B65B 3/32 137/625.19 |
| 4,614,073 | A * | 9/1986 | Argazzi | B65B 19/34 53/446 |
| 4,729,413 | A | 3/1988 | Shults | |
| 4,819,789 | A * | 4/1989 | Linner | B65B 3/16 141/129 |
| 4,874,022 | A | 10/1989 | Schwerdtel | |
| 5,102,599 | A * | 4/1992 | Shults | A23G 1/206 141/18 |
| 5,341,859 | A | 8/1994 | Houseman | |
| 5,484,052 | A | 1/1996 | Pawloski et al. | |
| 5,649,406 | A * | 7/1997 | Sonntag | B65B 43/02 198/378 |
| 5,769,203 | A * | 6/1998 | Marti Sala | B65G 17/32 198/397.01 |
| 5,897,090 | A | 4/1999 | Smith | |
| 5,944,073 | A | 8/1999 | Klein | |
| 6,082,077 | A * | 7/2000 | Christ | B65B 43/52 198/408 |
| 6,176,369 | B1 | 1/2001 | Petrovic | |
| 6,196,282 | B1 | 3/2001 | Mollers | |
| 6,293,387 | B1 | 9/2001 | Forster | |
| 6,604,559 | B2 * | 8/2003 | Rubin | B65B 3/36 141/121 |
| 6,848,480 | B2 | 2/2005 | Brennan | |
| 7,194,847 | B2 | 3/2007 | Summons | |
| 8,122,621 | B2 | 2/2012 | Carpenter | |
| 8,205,743 | B2 | 6/2012 | Meinzinger | |
| 8,695,791 | B2 * | 4/2014 | Ohman | B65G 17/00 198/803.14 |
| 2007/0267096 | A1 | 11/2007 | Uriel | |
| 2008/0313998 | A1 | 12/2008 | Ligon | |
| 2009/0084463 | A1 * | 4/2009 | Kohler | B65B 3/16 141/114 |
| 2012/0228094 | A1 | 9/2012 | Ohman | |

* cited by examiner

PUCK WEAR DETECTION

This application is a continuation-in-part of Fitzgerald, FILLING A CARTRIDGE, Ser. No. 13/840,151, (U.S. Pat. No. 5,072,049) filed Mar. 15, 2013, which claims priority benefit of provisional application U.S. 61/707,807, filed 28 Sep. 2012.

BACKGROUND OF THE INVENTION

Sealant, mastic, adhesive, glazing, caulk and glue composition can be packaged in a metal, plastic, plastic coated or impregnated paper cartridge that is adapted to be loaded into an extrusion device such as a caulking gun for dispersing the sealant composition. Typically, the cartridge comprises an elongated cylindrical body with a nozzle fitted to an exit orifice. A movable diaphragm or piston is disposed within the cylindrical body at an end opposite the nozzle. The cavity defined between the piston and top end contains the sealant composition.

The cartridge body can be a soft squeezable container made of paperboard, cardboard or corrugated fiberboard. The tube has a round or oval profile and hollow interior adapted to contain a thick liquid such as sealant, mastic, adhesive, glazing, caulk or glue composition.

The cartridge is filled with sealant, mastic, adhesive, glazing, caulk or glue composition by various processes. Russel, EU0035409 discloses a cartridge filling apparatus for Filling cartridges with a viscous material such as mastic, the apparatus including a loading station, a cartridge filling station, a cartridge capping station and a packaging station. An endless chain conveyor conveys individual cartridges successively from the loading station to the filling station where each cartridge is filled in turn and then to the capping station where each filled cartridge is capped. The cartridges are then dropped from the endless conveyor into the packaging station, which ensures that cartridges are correctly orientated for packaging and directs the cartridges into a suitably positioned packaging such as a cardboard box.

Petrovic, U.S. Pat. No. 6,176,369 proposes a puck carrier system for a conveying circuit. The circuit comprises a conveyor with lateral guides that selectively and slidably engage a portion of the carrier puck to prevent rotation of the puck during advancement. The puck comprises a main body having a rotational axis. The puck has a grooved flat bottom to marry orienting grooves and has tapered fingers that provide guidance to a loadable container such as a pouch. The fingers are defined by cutting grooves that are required to provide a pouch carrying configuration that may be of nearly equal width to the puck carrying cavity. However, the Petrovic puck is unsuitable to transport and load cartridges that that are narrower than the precise barrel of the puck or that have extended nozzles.

Schwerdtel et al., U.S. Pat. No. 4,874,022 is an example of another filling process. Schwerdtel et al, discloses a filling station that includes a filler valve, a positioning and centering device for positioning and centering cartridges in a position in alignment with the filler valve and a displacement drive for adjusting the position of the positioning and centering device and the filler valve in relation to each other. The positioning and centering device comprises a unit having a contact surface for the cartridges and a vacuum suction holder disposed in the unit. The vacuum suction holder comprises a suction hose having an open end disposed in the unit. The open end of the suction hose extends beyond the contact surface and is in the shape of a bellows.

The conveying systems for filling a cartridge repeatedly manipulate the cartridge causing wear to surfaces of the puck. Repeatedly manipulating the cartridge causes failures. The failures result in crushed cartridges, down time, and wasted manpower. Down time on a loading device directly leads to down time on a filler and capping apparatus. Smith et al., U.S. Pat. No. 5,897,090 proposes a carrier puck to address the misalignment and collapse problem. The Smith et al puck comprises a) a generally cylindrical housing having a central axis and a tube receiving opening at one end of the housing to provide access to an interior space of the housing and an end cap at an opposite end of the housing, and b) a spring supported on the end cap and having a plurality of spring arms projecting upwardly from the end cap toward the tube receiving opening, the spring arms being angularly spaced around the interior space of the housing.

Transport pucks are often involved in processes for filling cartridges. The pucks receive, support and stabilize the cartridges as they are advanced along automatic filling and assembling stations. Conveyors move the pucks with the cartridges from station to station. A conveyor may be a moving belt extending between opposing guide rails that maintain the pucks properly positioned on the moving belt.

Conveying and filling devices for the pucks can include a conveying track such as a belt or chain and a plurality of workstations. The cartridges to be filled are arranged slidably in relation to the tracks. Pucks are s conveyed along a conveying track that includes a plurality of work stations. Filling and handling caulk and sealant cartridges presents packaging and filling problems. The cartridge tube elongated shape in addition to a nozzle at one end imparts a cartridge a high center of gravity in vertical alignment, particularly when vertically aligned in a nozzle-down orientation. The high center of gravity is especially a problem when the cartridge is filled with a dense viscous material. Further, the dispensing nozzle protrudes from the cartridge at the only available flat surface on which the cartridge can be set during filling. A problem with nozzle-down cartridge filling devices is that the cartridge holders or pucks wear as they are used. Wear on the puck bottom is difficult to observe. The bottom ear can be uneven so that the holder or puck s tilted to an imbalanced position. As the puck is imbalanced it becomes increasingly difficult to properly load nozzle-down cartridges. The cartridges are angle loaded so that the nozzles strike puck walls, chipping puck lips or damaging the cartridge nozzles. The damage nozzles do not seat properly into the pucks and can break oil and become lodged into the conveying system. Improperly seated cartridges and lodged nozzles become interfere with the continuous filling device by becoming intertwined in the device mechanism causing system damage and down time. Prior art wear indicators are insufficient. A single bottom face indicator can be difficult to observed through the conveying machinery. Additionally, since the indicator provides information on wear at only a single location on the puck base, tipping can become a problem even when the indicator indicates minimal wear There is a need for easily discernible indicator mechanism that will provide accurate information on degree and location of wear on the bottom of nozzle down cartridge pucks

BRIEF DESCRIPTION OF THE INVENTION

The invention provides an in-line indicator mechanism that provides degree and location information for a transport puck used in a nozzled cartridge filling process.

In an embodiment, the invention provides nozzle-down cartridge transport puck to detect surface wear, comprising (i) an upper sleeve, shaped to receive a caulking cartridge, nozzle-down in vertical alignment to a lower plug portion; and (ii) a substantially solid lower plug portion, comprising a lead face and a bottom face for stable contact and frictional engagement with level planar surface; a center passageway at least partially shaped with a side contact stop collar that includes a surface that tapers from a wider lead surface opening to a narrower bottom surface opening or to a tubular sleeve from the side contact face to the bottom face opening; and at least one funnel-shaped bore into the bottom face with an inserted connector comprising a head and stem, the head spaced within the bore to define a spacing that identifies a bottom face wear.

In another embodiment, the invention is a nozzle-down tilling system for filling cartridges with a viscous material, comprising a cartridge loading station comprising a transport puck adapted to receive the cartridge in a nozzle-down vertical alignment, the transport puck comprising (i) a substantially solid lower plug portion, having a lead face and a bottom face and a center passageway that is at least partially in the form of a side contact stop collar having a face that tapers from a wider lead face opening to a narrower bottom face opening or to a tubular sleeve from the side contact face to the bottom face opening; (ii) an upper channel, shaped to receive the caulking cartridge in the vertical alignment to the lower plug portion; and (iii) at least one funnel-shaped bore into the bottom face with an inserted connector comprising a head and stem, the head spaced within the bore to define a spacing that has been determined to identify bottom face wear; a filling station adapted to receive the cartridge with a viscous material; a capping station to cap the cartridge; and a conveyor adapted to receive a cartridge dispensed by the loading station and for conveying the cartridge in turn to the filling station and then the capping station.

In another embodiment, the invention is a method to control surface wear on a nozzle-down cartridge puck, comprising: determining an extent of acceptable wear to a contact surface of the nozzle-down cartridge puck; providing the contact surface with at least one bore; imbedding a fastener with a head and stem into the bore so that the head is within the bore the determined extent of acceptable wear; and replacing the contact surface when the head is substantially level with a worn contact surface.

In another embodiment, the invention is method for filling a nozzled caulking cartridge comprising: vertically aligning the cartridge in a transport puck, nozzle down, by an apparatus to unscramble and load the puck comprising (i) substantially solid lower portion, having a bottom face for stable contact and frictional engagement with level planar surfaces, and attached thereto, opposite the bottom face, (ii) an upper sleeve, shaped to receive the caulking cartridge in a nozzle-down alignment; and (iii) at least one funnel-shaped bore into the bottom face with an inserted connector comprising a head and stem, the head spaced within the bore to define a spacing that has been determined to identify an extent of bottom face wear; wherein the lower portion has a weight and the bottom face has sufficient breadth to maintain the center of gravity of the puck and filled caulker, below a tipping plane; transporting the puck to an apparatus for filling the caulking cartridge; filling the cartridge; and capping the cartridge.

BRIEF DESCRIPTION OF THE DRAWING

FIG. 4A is an elevation of a transport puck of a preferred embodiment of the invention; FIGS. 4B and 4C are detail views of a fastener shown in 4A, 4D is a cut away elevation view and FIG. 4E is a perspective view of the lower portion connection to the upper sleeve of part of the 4A puck.

DETAILED DESCRIPTION OF THE INVENTION

This application relates to an improved transfer puck or puck that can accommodate viscose material cartridges that are fitted with extended nozzles. The invention provides a transfer puck and a filling method to overcome cartridge compression and destruction problems occasioned by improper or forced seating of a cartridge within a carrier transport puck or holder.

Briefly, according to the present invention, there is provided a method for filling a cartridge and a transport puck or holder for use with the same cartridge. The filling of unstable, elongated cartridges with sealant is an example of a container method and filling system that is improved by the invention. The term "sealant" as used herein includes an entire variety of caulks including silicones, latex and acrylic caulk; filler compounds; adhesive or mastic-type materials, such as stucco, concrete and cementious-material patching and crack filling compounds; gasketing compounds; gutter, flashing, skylight, or fluid tank seam filling materials or sealant compounds; butyl or rubber sealants, cements and caulk; roof cements; panel and construction adhesives; glazing compounds and caulks; gutter and lap sealants; silica gel-based firebrick, masonry and ceramic crack tillers and cements; silicone based glues; ethylene glycol-containing latex glazing compounds; and the like.

One preferred sealant is an organopolysiloxane room temperature vulcanizable (RTV) composition. The room temperature vulcanizable silicone elastomer composition can contain a silanol stopped base polymer or elastomer, reinforcing and/or extending filler, cross-linking silane and cure catalyst. These RTV compositions are prepared by mixing diorganopolysiloxanes having reactive end groups with organosilicon compounds that possess at least three hydrolyzably reactive moieties per molecule. The known RTV compositions are widely used as elastic sealing materials for applications involving the gaps between various joints such as: gaps between the joints of structures; joints between structural bodies and buildings; gaps between a bathtub and wall or floor; cracks on tiles in bathrooms; gaps in the bathroom such as those around a washbasin and those between a washbasin supporting board and a wall; gaps around a kitchen sink and the vicinity; spacings between panels in automobiles, railroad cars, airplanes and ships; gaps between prefabricated panels in various electric appliances, machines; and the like. Room temperature vulcanizable silicone sealants thus may be utilized in a wide variety of caulking and sealing applications.

Features of the invention will become apparent from the drawings and following detailed discussion, which by way of example without limitation describe preferred embodiments of the invention.

Figure 1:
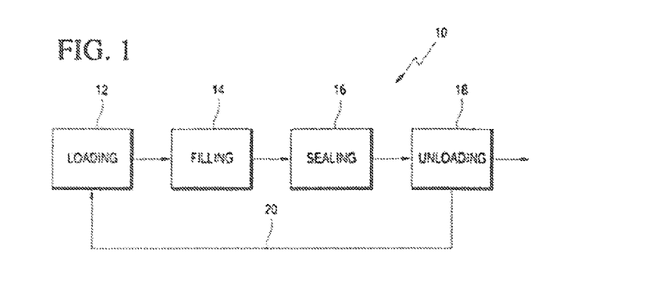
FIG. 1 is a block diagram of a cartridge filling system that utilizes the transport puck of the invention.

FIG. 1 is a block diagram of a "nozzle-down" cartridge filling system that can include the cartridge filling method and transport holder of the invention. The figure illustrates a preferred filling system based on the system of Shultz U.S. Pat. No. 4,729,413, assigned to a predecessor to the present assignee. With reference to FIG. 1, the nozzle-down filling system 10 of the invention includes a loading station 12, filling station 14, cartridge sealing station 16 and an unloading station 18. An endless chain 20 conveys individual cartridge successively from loading station 12 to the filling station 14 where each cartridge is filled in turn and then to the scaling station 16 where each filled cartridge is closed. The cartridges are then dropped from the endless conveyor 20 into an unloading station 18 where the cartridges are orientated for packaging and packaged in a parcel such as a cardboard box.

In the filling process, empty caulking cartridges are stored in a bin and fed by gravity, belt or otherwise to an apparatus to unscramble and load the caulking cartridges nozzle-down into transport pucks at loading station 12. In the unscramble and load apparatus, the cartridges are spilled onto an inclined and vibrating surface with slots or channels the width of a cartridge running in the direction of incline. The vibrating action moves the cartridges down the incline while at the same time places them in a slot with nozzle pointing either up or down the incline. At the edge of the vibrating surface, the cartridges that are nozzle-down are allowed to fall into a chute which places the cartridge in a transport puck passing below.

The loaded transport puck is then transported to filling station 14 that includes an apparatus for filling the nozzle-down caulking cartridge. The transport pucks are queued at the entrance of the filling station 14 apparatus to avoid unscrambling and loading problems that may occur with cartridges that are improperly seated into the transport puck. The filling station 14 can be a rotary filler that accepts the transport pucks from single file. The rotary filler fills the caulking cartridge while rotating the pucks around an outside diameter of a circular housing. Filling is accomplished by inserting a male nozzle into the open end of the caulking cartridge and while withdrawing the male nozzle from the cartridge. The cartridge can be immediately capped after tilling. The capped cartridge is then transported to unloading station 18 where the caulking cartridges are removed from the transport pucks and loaded into the packages or the like. The empty transport pucks are released from the unloading station and the empty transport pucks are circulated via the endless conveyor 20.

Forster U.S. Pat. No. 6,293,387 provides a suitable FIG. 1 filling system 10. The Forster filling system includes a carrier that can orient and covey transport pucks along a pathway that has guide elements that cooperative with the carrier. A drive means moves the transport holders along the pathway. Geisel U.S. Pat. No. 3,788,035 discloses a suitable FIG. 1 filling system. The Geisel apparatus for filling and emptying caulking material cartridges an endless conveyor for moving cartridges in side-by-side rows along an endless conveyor past filling stations. Supports are provided on the conveyor to support cartridge tubes by the discharge nozzle. The disclosure of Forster U.S. Pat. No. 6,293,387 and Geisel U.S. Pat. No. 3,788,035 are incorporated into this specification by reference in their entirety.

Figure 2:
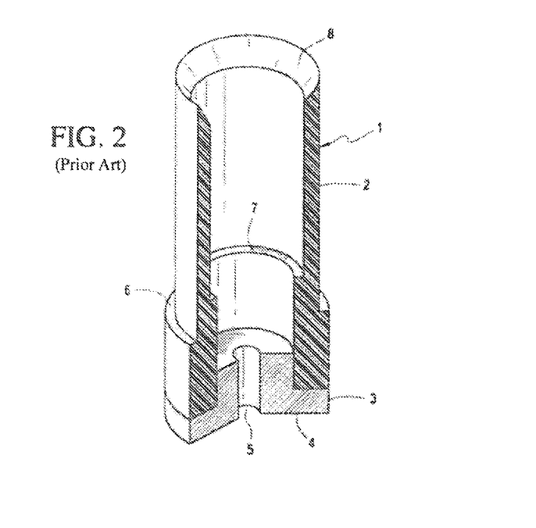
FIG. 2 is a perspective view, partially broken away of a prior art transport puck.

FIG. 2 is a prior art transfer holder disclosed by Shultz, U.S. Pat. No. 4,729,413 assigned to a predecessor to the present assignee. Shultz discloses a transfer holder designed to address prior art cartridge misalignment and collapse that can occur during the multiple puck queuing, unscrambling and insertion steps of the nozzle-down filling method. Shultz teaches filling a caulking by (a) vertically aligning a cartridge in a transport holder, nozzle-down, by using a holder that comprises (i) a substantially solid lower portion, having a bottom face for stable contact and frictional engagement with a level planar surface, and (ii) an upper sleeve, shaped to receive a caulking cartridge in alignment and (iii) a lower portion wherein the lower portion has sufficient weight and the bottom face has sufficient breadth to maintain the center of gravity of the holder and filled cartridge, below a plane passing through any single fulcrum point or edge of the bottom face and extending upward through the sleeve from the level planar surface at an angle of about 60°; (b) transporting the puck to an apparatus for filling the caulking cartridge; and (d) filling the cartridge.

The Shultz transfer puck vertically aligns the caulking cartridge, nozzle-down. The puck comprises (a) a substantially solid lower portion, having a bottom face for stable contact and frictional engagement with level planar surfaces, and attached thereto, opposite the bottom face, (b) an upper sleeve, shaped to receive the caulking cartridge in the desired alignment, wherein the lower portion has sufficient weight and he bottom face has sufficient breadth to maintain the center of gravity of the puck and a filled caulking cartridge, below a plane passing through any single fulcral point or edge of the bottom face and extending upward through the sleeve from the level planar surface at an angle of about 60°.

FIG. 2 is a perspective view, partially broken away of the Shultz U.S. Pat. No. 4,729,413 transfer puck. The puck 1 comprises a substantially solid lower portion 3 and an upper sleeve 2. The primary functions of the lower portion 3 of the Shultz transport puck 1 is to provide a surface for stable contact with a substantially level planar surface and to control the center of gravity of the combination of puck 1 and caulking cartridge 9. The lower portion has a bottom surface 84 that is flat, grooved, concave or the like to provide a planar contact. The bottom puck carrier face 4 is preferably a flat smooth surface. Bottom surface 84 has sufficient breadth and the bottom portion 3 has sufficient weight to maintain the center of gravity of the puck 1, including a filled caulking cartridge 9 low enough that the puck 1 does not easily tip in processing.

Lower portion 3 has a nozzle-receiving channel 5 into which a nozzle of caulking cartridge 9 may extend upon loading as described in the invention figures to follow. Upper sleeve 2 is attached to the bottom portion 3 opposite its bottom surface 84. Upper sleeve 2 defines a cylinder that is open at an end opposite bottom portion 3 to receive caulking cartridge 9. Upper sleeve 2 has guiding and spacing surfaces. Guiding surface 8 is inclined toward the opening so as to guide a falling caulking cartridge 9 into the transport puck 1. Surface 7 is provided as a seat for caulking cartridge 9 once loaded into transport puck 1 and surface 6 provides spacing of the transport puck 1 when queued in formation.

Figure 3A:
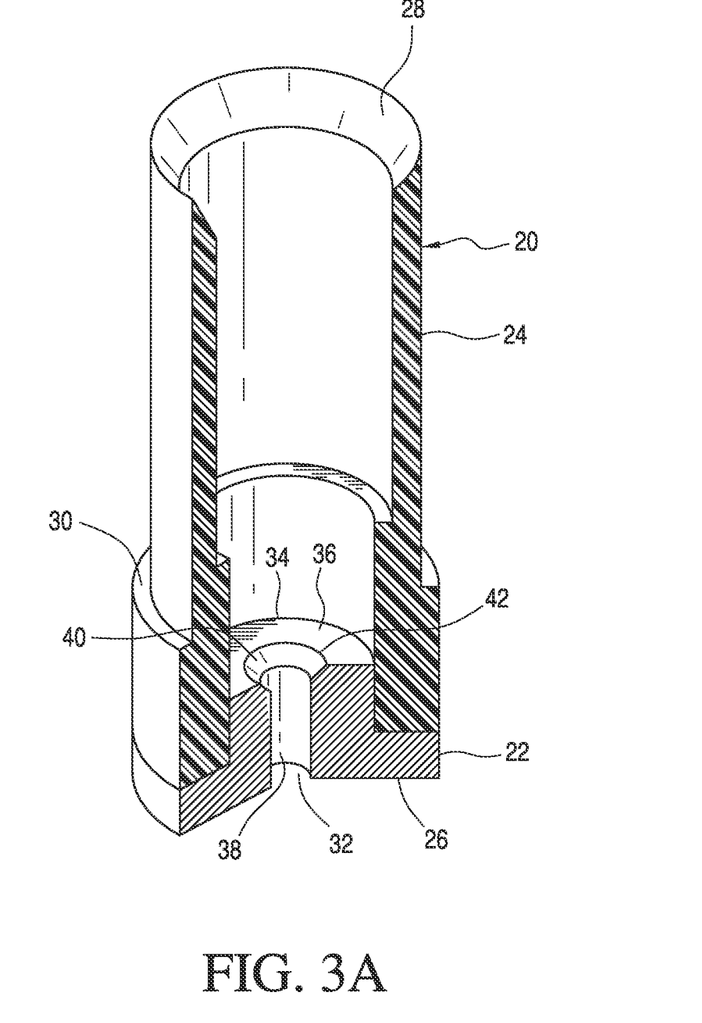
FIG. 3A is a perspective view, partially broken away of a transport puck of the invention.
Figure 3B:
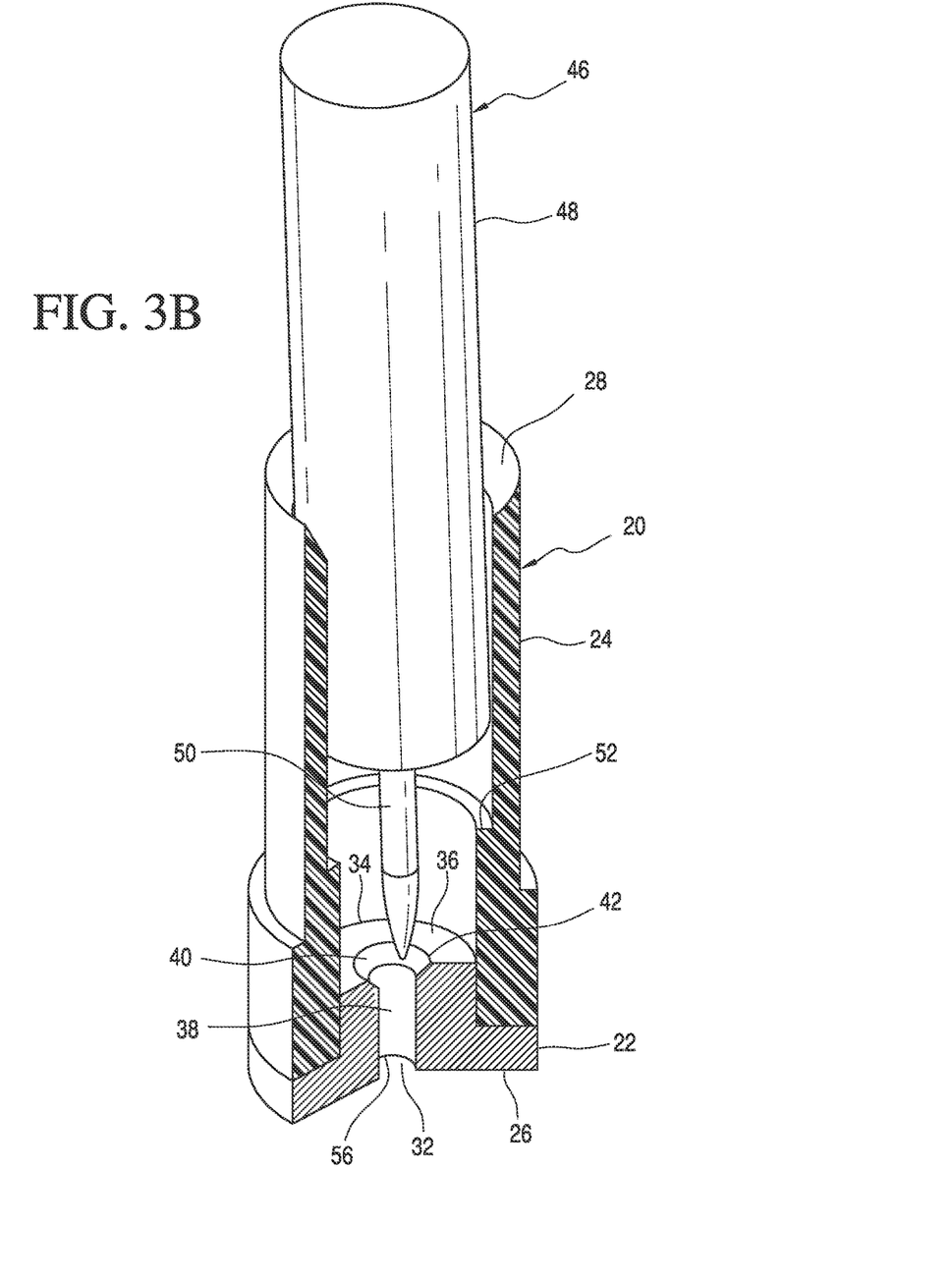
FIG. 3B is the same view showing an inserting cartridge postured with nozzle off-set with respect to the puck nozzle receiving channel and FIG. 3C is the same view showing the cartridge with nozzle correctly correct seated in the receiving channel of the puck.

The Shultz transport puck may fail to accommodate an improperly loaded cartridge or a cartridge with off-center or misaligned nozzle that fail to nest into the nozzle receiving channel 5. Hence, while the Shultz carrier puck 1 is an improvement for accepting cartridges in aligned aspect, cartridge misalignment problems persist. Off center nozzles and misaligned cartridges result in jamming and cartridge collapse when inserted into the transport puck. This results in production line interruption and downtime FIG. 3A is a perspective view, partially broken away of a transport puck of the invention. FIG. 3B is the same view showing an inserting cartridge with offset or misaligned nozzle and FIG. 3C is the same view showing the cartridge with nozzle correctly seated in a carrier puck.

Figure 3C:
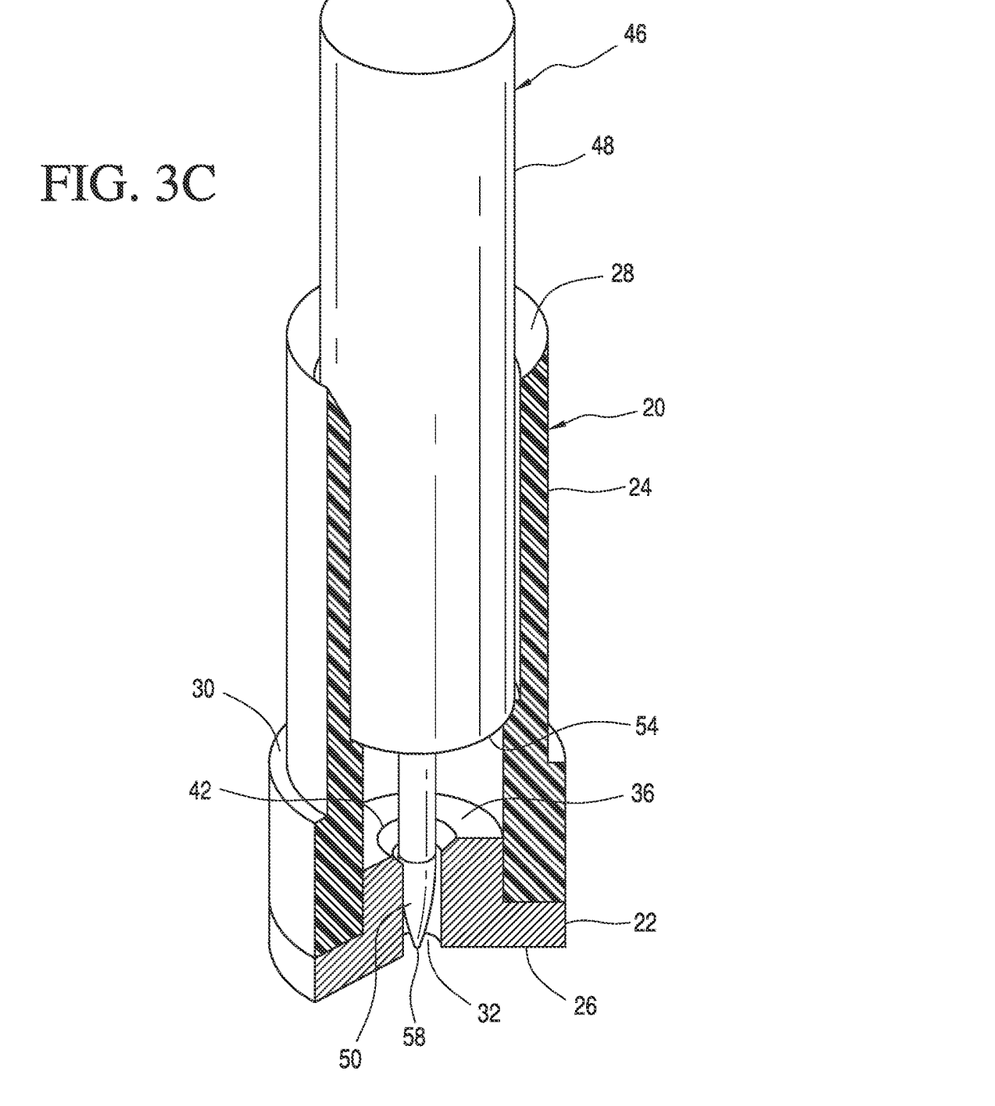

With reference to FIGS. 3A, 3B and 3C, the invention transport puck 20 similarly to the Shultz transport puck 1, comprises a substantially solid lower portion 22 and an upper sleeve 24. Lower portion 22 has a bottom face 26 that is part of a lower plug portion 34, hereinafter described in detail. Surface 28 is provided as a seat for a loaded caulking cartridge and surface 30 provides spacing of a transport puck when queued in formation. Upper sleeve 24 receives and secures a caulking cartridge in an alignment such that a properly fitted and aligned cartridge nozzle will nestle firmly and securely into nozzle receiving channel 32.

The FIG. 3A transport puck 20 includes a substantially solid lower plug portion 34 having a lead face 36 and a bottom face 38. The plug portion 34 defines a nozzle receiving channel 32. The nozzle receiving channel 32 can be described as an inverted frustum-shaped or modified frustum shaped center passageway that defines an inclined side contact face 40 that tapers from a wider lead face opening 42 to a narrower bottom face opening 44. The tapering contact face 40 can be defined as a plane that forms an acute angle at intersection with a plane of the lead face 36. According to the present invention, intersection of the plane of the lead face and a plane of the tapering contact face 40 defines an acute angle at least greater than 15°, preferably between 20° to 75° and most preferably between 40° to 60°.

The tapering contact face 40 provides a biasing surface that aligns and nests an inserted off-center nozzle into the nozzle receiving channel 32 to overcome problems of off-center nozzles and improperly inserted cartridges.

FIG. 3B shows one nozzle receiving channel embodiment of the plug portion 34 of the transport puck 20, FIG. 3B shows the nozzle receiving channel 32, of plug portion 34. The plug portion has lead face 36, inclined side contact face 40 and defines a nozzle receiving channel lower inner wall 38. The receiving channel lower inner wall 38 has wider lead face opening 42 and narrower bottom face 44.

In FIG. 3B and FIG. 3C, cartridge 46 comprises a tubular barrel 48 terminating in a nozzle 50. In one embodiment shown in the figures, the interior configuration of the nozzle receiving channel 32 is important. In this embodiment, receiving channel as shown is characterized by annular shoulder 52 that provides a retaining stop surface against a leading wall 54 of an emplaced cartridge 46. In this embodiment, a distance between the annular shoulder 52 and an exit aperture 56 at bottom face 26 is set to substantially equal to or less than a distance from a cartridge leading wall edge 34 and the tip 58 of cartridge nozzle 50.

FIG. 3C is a perspective view, partially broken away of the transport puck 20 of the invention with an inserted cartridge 34 that has been biased into proper seating within the nozzle receiving channel 32 of the FIG. 3A transport puck 20. FIG. 3C shows the transport puck 20 with an inserted and seated cartridge 46 having a cartridge barrel 48 that generally is a collapsible paperboard, cardboard or corrugated fiberboard material. The cartridge 46 has nozzle 50, which initially is misaligned or off-center from the cartridge barrel 48.

As shown in FIGS. 3B and 3C, on improper angled insertion of a cartridge 46 with nozzle 50 and nozzle tip 52 into transport puck 20, misaligned or nozzle 50 initially contacts the inclined side contact face 40. In accordance with the invention, while the cartridge 46 is inserting into the puck 20 as shown in FIG. 3B, the off-center nozzle 50 is biased by the inclined side contact face 40 into a proper seating within the puck receiving channel 32 as shown in FIG. 3C. The cartridge is seated 46 with its leading lip 54 seated to an annular shoulder 52 of the puck 20.

Figures 4A, 4B, 4C, 4D, 4E:
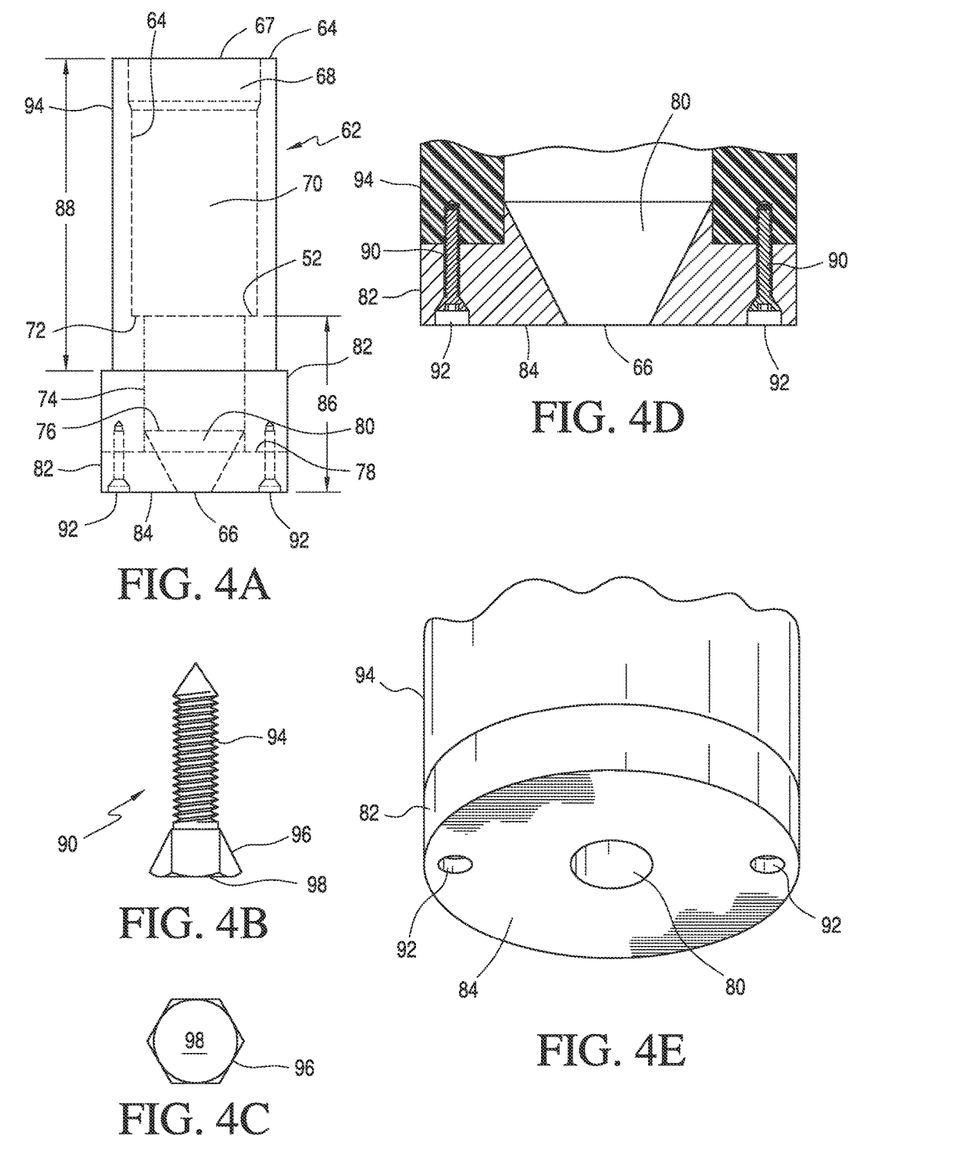

FIG. 4A is an elevation of a transport puck of a preferred embodiment of the invention; FIGS. 4B and 4C are detail views of a fastener of FIG. 4A; FIG. 4D is a cut away elevation view and FIG. 4E is a perspective view of the lower portion connection to the upper sleeve of part of the 4A puck.

In FIG. 4A, a puck 62 includes an upper tubular channel 68, shaped with-in the puck upper sleeve 88 to receive a cartridge 46 (shown in FIGS. 3B and 3C) in a desired vertical alignment within the tubular channel 68 leading to a bottom face opening 66. Puck 62 comprises a substantially cylindrical shape with a stepped center passageway 70 that forms an annular stop collar 72 and a lower face 74 that tapers from a wider lead face opening 76 to the narrower bottom face 66 to form a tapered nozzle receiving channel 80 within puck base 82 at surface 84.

In this embodiment, puck base 82 material loss that results from providing a tapered nozzle receiving channel 80 is offset by extending center passageway 70 by an extent designated 78 to maintain the lower puck center of gravity to resist puck tipping. Additionally, in the FIG. 4A embodiment, puck holder lip 64 is widened to avoid chipping of the lip 64 that may occur if the puck 62 unintentionally falls to the floor.

FIG. 4D is a cut away elevation view and FIG. 4E is a perspective view of the lower section 86 of a puck 62 showing an inventive embodiment. Lower section 86 shows puck base 82 and an upper sleeve 88. The lower section 86 is connected to the upper sleeve 88 by fastener 90 that threads into bore 92 provided through bottom surface 84.

FIGS. 4B and 4C are detail views of fastener 90 of FIG. 4D. In this embodiment, the fastener 90 is a screw with head 96 and stem 94. The head 96 is conical in shape with a wider even head surface 98. The stem 94 is threaded to match the complimentary receiving threads of bore 92. The nozzle-down cartridge transport puck of claim 1, wherein the head of the connector has an indicator that visually contrasts with the bottom face surface. The visual contrast can be imparted by a contrasting head surface 98 material or by an added pigment such as a paint or chalk.

Functions of puck base 82 of the transport puck 62 include providing a surface 84 for stable contact with a substantially level planar surface and controlling the center of gravity oldie combination of puck 62 and caulking cartridge 46. Thus, the puck base 82 should have a bottom surface 84 that provides a planar relationship with definable bottom surface 84 contact points. Additionally, puck base 82 should have sufficient breadth and weight to maintain the center of gravity of the puck 62, including a filled caulking cartridge 46, low enough that the puck 62 does not tip in processing. Generally, the center of gravity should be maintained below a plane passing through any single fulcral point or edge of the bottom surface 84 and extending upward through extended center passageway 70 from the level planar surface 84 at an angle of about 60°.

The bottom surface 84 is preferably made from materials having a specific gravity of greater than about 2. A high specific gravity makes it more convenient to lower the center of gravity with as compact a lower section 86 as possible. Preferably, the lower section 86 is made of metal or filled plastic. In the embodiment shown, the lower section 86 has receiving channel 80 into which nozzle 50 of caulking cartridge 46 may extend upon loading. This permits caulking cartridge 46 to sit lower in transport puck 62 to impart a lower center of gravity.

Upper sleeve portion 88 extends bottom portion 86 extends upper sleeve portion 88 to bottom surface 84. Upper sleeve 88 receives and secures the caulking cartridge 46 in a desired alignment. In this embodiment, upper sleeve 88 defines a cylinder which is open 67 at the end opposite the bottom to receive the caulking cartridge 46. Upper sleeve 88 may have as solid or perforated wall or the upper sleeve 88 may be defined by ribs which extend from a substantially solid lower portion 86 to define passageway 70. Upper sleeve 88 can have guiding and spacing surfaces. Guiding surface (28 in FIGS. 3A, 3B and 3C) is inclined from opening 67 so as to guide a falling caulking cartridge 46 into the transport puck 62 as appropriate. Surface 52 is provided as a seat for caulking cartridge 46 once loaded into transport puck 62.

The upper sleeve 88 is preferably made from materials having a specific gravity less than about 2. A low specific gravity makes it more convenient to lower the center of gravity with as compact a lower portion 86 as possible. Preferably, the upper sleeve 88 is made of plastic, such as polyolefin, polyester or wood.

A weight ratio of upper sleeve 88 to lower portion 86 is preferred at most about 2/3. In practice this ratio should be as low as possible. The elongated shape of the caulking cartridge 46 requires that the height of the upper sleeve 88 be a major portion of the transport puck 62. Thus, it is preferred that the upper sleeve 88 to lower portion 86 height ratio is at least about 3/2.

Wear to a puck bottom surface 84 can cause an imbalance. The puck may tip and fall from the production line. A tipped puck can interfere with a conveying mechanism to cause damage to the conveying system and down time. In the 4A-4E embodiment. A puck base 82 is provided with bore 92 at surface 84 and complimentary fastener 90 with stem 94 and head 96 to fasten puck base 82 to supper sleeve 88. The bore 92 is designed and constructed to seat fastener 90. The fastener 90 can be funnel shaped or conical shaped with a wider and a narrower opening at two ends with a base that is a circle and sides that taper toward a point with head 96 within a depth such that the head 96 evens with a worn bottom surface 84 at an extent of acceptable bottom surface 84 wear. In this embodiment, an acceptable face wear depth is determined that can be tolerated without puck imbalance. Bottom surface 84 is provided with a plurality of evenly inserted fasteners 90. The plurality of fasteners 90 sense both wear and uneven wear to the determined acceptable wear.

While preferred embodiments of the invention have been described, the present invention is capable of variation and modification and therefore should not be limited to the precise details of the Examples. The invention includes changes and alterations that fall within the purview of the following claims.

What is claimed is:

1. A nozzle-down cartridge transport puck to detect surface wear, comprising:
   (i) an upper sleeve, shaped to receive a caulking cartridge, nozzle-down in vertical alignment to a lower plug portion; and
   (ii) a substantially solid lower plug portion, comprising a lead face and a bottom face for stable contact and frictional engagement with level planar surface;
   a center passageway at least partially shaped with a side contact stop collar that includes a surface that tapers from a wider lead surface opening to a narrower bottom surface opening or to a tubular sleeve from the side contact face to the bottom face opening; and
   at least one funnel-shaped bore into the bottom face with an inserted connector comprising a head and stem, the head spaced within the bore to define a spacing that has been determined to identify bottom face wear.

2. The nozzle-down cartridge transport puck of claim 1, wherein the head of the connector has an indicator that visually contrasts with the bottom face surface.

3. The nozzle-down cartridge transport puck of claim 1, wherein the substantially solid lower plug portion having a lead face and a bottom, includes a nozzle receiving channel having a shaped center passageway that defines an inclined side contact face tapering from a wider lead face opening to a narrower bottom face opening.

4. The nozzle-down cartridge transport puck of claim 1, wherein the substantially solid lower plug portion having a lead face and a bottom includes a nozzle receiving channel in the form of an inverted frustum-shaped or modified frustum shaped center passageway that defines an inclined side contact face that tapers from a wider lead face opening to as narrower bottom face opening and the tapering contact face defines a plane that forms an acute angle at least greater than 15° at intersection with a plane of the lead face.

5. The nozzle-down cartridge transport puck of claim 1, wherein the substantially solid lower plug portion having a lead face and a bottom defines a nozzle receiving channel in the form of an inverted frustum-shaped or modified frustum shaped center passageway that defines an inclined side contact face that tapers from a wider lead face opening to a narrower bottom face opening and the tapering contact face defines a plane that forms an acute angle between 20° to 75° at intersection with a plane of the lead face.

6. The nozzle-down cartridge transport puck of claim 1, wherein the substantially solid lower plug portion having a lead face and a bottom defines a nozzle receiving channel in the form of an inverted frustum-shaped or modified frustum shaped center passageway that defines an inclined side contact face that tapers from a wider lead face opening to a narrower bottom face opening and the tapering contact face defines a plane that forms an acute angle between 40° to 60° at intersection with a plane of the lead face.

7. The nozzle-down cartridge transport puck of claim 1, wherein an intersection of a plane of the lead face and the plane of the side contact face defines an acute between 20° to 75°.

8. The nozzle-down cartridge transport puck of claim 1, wherein an intersection of a plane of the lead face and the plane of the side contact face defines an acute angle between 40° to 60°.

9. The nozzle-down cartridge transport puck of claim 1 wherein the lower plug portion has a weight and the bottom face has a breadth to maintain a center of gravity of the puck and a filled caulking cartridge, below a plane passing through any single fulcral point or edge of the bottom face and extending upward through the sleeve from the level planar surface at an angle of about 60°.

10. The nozzle-down cartridge transport puck of claim 1 wherein the lower portion comprises a material having a specific gravity greater than about 2.

11. The nozzle-down cartridge transport puck of claim 1 wherein the upper sleeve comprises a material having a specific gravity of less than 2.

12. The nozzle-down cartridge transport puck of claim 1 wherein the upper sleeve to lower portion weight ratio is a maximum of about 2/3.

13. The nozzle-down cartridge transport puck of claim 1 wherein the upper sleeve to lower portion height ratio is greater than about 3/2.

14. The nozzle-down cartridge transport puck of claim 1 wherein the lower portion comprises materials selected from the group consisting of metal filled plastic.

15. The nozzle-down cartridge transport puck of claim 1 wherein the upper sleeve comprises materials selected from the group consisting of plastic and wood.

16. The nozzle-down cartridge transport puck of claim 1 wherein the ratio of maximum height to maximum width exceeds about 1/1.

17. The nozzle-down cartridge transport puck of claim 1 wherein the head is signified by a contrasting head surface material or by an added pigment, paint or chalk.

18. A nozzle-down tilling system for filling cartridges with a viscous material, comprising a cartridge loading station comprising a transport puck adapted to receive the cartridge in a nozzle-down vertical alignment, the transport puck comprising (i) a substantially solid lower plug portion, having a lead face and a bottom face and a center passageway that is at least partially in the form of a side contact stop collar having a face that tapers from a wider lead face opening to a narrower bottom face opening or to a tubular sleeve from the side contact face to the bottom face opening; (ii) an upper channel, shaped to receive the caulking cartridge in the vertical alignment to the lower plug portion; and (iii) at least one funnel-shaped bore into the bottom face with an inserted connector comprising a head and stem, the head spaced within the bore to define a spacing that has been determined to identify bottom face wear;
   a filling station adapted to receive the cartridge with a viscous material;
   a capping station to cap the cartridge; and
   a conveyor adapted to receive a cartridge dispensed by the loading station and for conveying the cartridge in turn to the filling station and then the capping station.

19. A method for filling a nozzled caulking cartridge comprising:
   vertically aligning the cartridge in a transport puck, nozzle down, by an apparatus to unscramble and load the puck comprising (i) a substantially solid lower portion, having a bottom face for stable contact and frictional engagement with level planar surfaces, and attached thereto, opposite the bottom face, (ii) an upper sleeve, shaped to receive the caulking cartridge in a nozzle-down alignment; and (iii) at least one funnel-shaped bore into the bottom face with an inserted connector comprising a head and stem, the head spaced within the bore to define a spacing that has been determined to identify an extent of bottom face wear; wherein the lower portion has a weight and the bottom face has sufficient breadth to maintain the center of gravity of the puck and filled caulker, below a tipping plane;
   transporting the puck to an apparatus for filling the caulking cartridge;
   filling the cartridge; and
   capping the cartridge.

20. The nozzle-down filling system for filling cartridges with a viscous material of claim 18, wherein the head of the connector has an indicator that visually contrasts with the bottom face surface.

* * * * *